(12) United States Patent
Donatelli et al.

(10) Patent No.: US 7,316,028 B2
(45) Date of Patent: Jan. 1, 2008

(54) METHOD AND SYSTEM FOR TRANSMITTING INFORMATION ACROSS A FIREWALL

(75) Inventors: Alex Donatelli, Rome (IT); Marco Lerro, Rome (IT)

(73) Assignee: International Business Machines Corporation, Armonk, NY (US)

( * ) Notice: Subject to any disclaimer, the term of this patent is extended or adjusted under 35 U.S.C. 154(b) by 839 days.

(21) Appl. No.: 10/290,416

(22) Filed: Nov. 7, 2002

(65) Prior Publication Data

US 2003/0126230 A1 Jul. 3, 2003

(30) Foreign Application Priority Data

Dec. 21, 2001 (EP) .................................. 01480148

(51) Int. Cl.
G06F 21/22 (2006.01)
H04L 9/30 (2006.01)

(52) U.S. Cl. ................... 726/11; 726/3; 726/6; 726/13; 726/12; 380/259

(58) Field of Classification Search ................... 726/11
See application file for complete search history.

(56) References Cited

U.S. PATENT DOCUMENTS

| | | | | |
|---|---|---|---|---|
| 5,983,350 | A * | 11/1999 | Minear et al. ................. | 726/11 |
| 6,349,336 | B1 * | 2/2002 | Sit et al. ....................... | 709/227 |
| 6,510,464 | B1 * | 1/2003 | Grantges et al. ............. | 709/225 |
| 6,550,012 | B1 * | 4/2003 | Villa et al. ..................... | 726/11 |
| 6,799,220 | B1 * | 9/2004 | Merritt et al. ............... | 709/238 |
| 6,847,614 | B2 * | 1/2005 | Banker et al. ............... | 370/252 |
| 2002/0023210 | A1 * | 2/2002 | Tuomenoksa et al. ....... | 713/161 |
| 2002/0199007 | A1 * | 12/2002 | Clayton et al. .............. | 709/230 |
| 2004/0028035 | A1 * | 2/2004 | Read ........................... | 370/352 |
| 2004/0044758 | A1 * | 3/2004 | Palmer et al. ............... | 709/223 |

* cited by examiner

*Primary Examiner*—Christopher Revak
*Assistant Examiner*—Saoussen Besrour
(74) *Attorney, Agent, or Firm*—Duke W. Yee; Jeffrey S. LaBaw; Gerald H. Glanzman

(57) ABSTRACT

A method (300;400) and system (100) for transmitting information across a firewall (130b) between multiple endpoints (120) and gateways (135), in a resource management environment (such as the TME) having characteristics that are firewall-incompatible. A gateway proxy (125g) and an endpoint proxy (125e) are associated with the endpoints and the gateways, respectively. The two proxies are connected to each other by means of a pass through communication tunnel crossing the firewall, which tunnel is secured by mutual authentication of the gateway proxy and the endpoint proxy at its ends. Each endpoint and each gateway is tricked into communication only with the respective proxy. Particularly, a listening port is allocated on the endpoint proxy on behalf of each endpoint, so that the corresponding gateway will open a connection back to the endpoint proxy on the listening port for transmitting any packet to the endpoint. A table (230) stored on the endpoint proxy associates each listening port with the corresponding endpoint for managing the routing of the packets.

3 Claims, 6 Drawing Sheets

METHOD AND SYSTEM FOR TRANSMITTING INFORMATION ACROSS A FIREWALL

The present invention relates to a method and system for transmitting information across a firewall.

Networks implementing distributed data processing systems, and in particular the INTERNET, have attained a widespread diffusion in the last years. A major concern of organisations wishing to embrace the INTERNET as a way of conducting business is that of exposing their internal private network to the outside world. Several security issues are raised by this kind of applications, which involve attachment of the (secure) private network of the organisation to the largely uncontrolled environment of the INTERNET. Particularly, the organisation must be protected from intruders attempting to gain unauthorised access to the private network or attempting to compromise its operation.

Most security measures involve the use of a firewall. A firewall consists of hardware and/or software controlling the traffic between the INTERNET and the private network; all messages entering or leaving the private network pass through the firewall, which allows only certain traffic to transit as specified by a firewall administrator.

A large number of resource management environments, such as the Tivoli Management Environment, or TME (TME is a trademark of International Business Machines Corporation) have been developed before the diffusion of the INTERNET. Generally, these management environments are designed to run in a back-office, wherein the network is considered close and secure. For example, the management environment can freely open logical connections (or ports) between any couple of computers of the network, or it assumes that connections can be made using not-secure protocols, such as the suite of the Transmission Control Protocol/Internet Protocol (TCP/IP); moreover, the management environment is allowed to broadcast messages over the network, for example through the User Datagram Protocol (UDP). The above-mentioned characteristics (or other equivalent ones) make these management environments firewall-incompatible.

Different solutions have been proposed for interfacing existing management environments with an extension of the private network of the organisation (a so called Demilitarised Zone, or DMZ), which is in contact with the INTERNET directly. For example, a solution known in the art consists of reducing the number of ports that can be opened across the firewall; moreover, the range from which these ports are selected is restricted to a small set of values. More recently, proposals have been made to limit the use of ports even further; in these proposals, every communication between two computers across the firewall should be consolidated to a single, well-defined port.

However, none of the solutions known in the art is completely satisfactory. In fact, limiting the number of ports makes a security hole in the firewall smaller, but it does not close the private network to intruders.

Moreover, the proposed new features require the management environment to be modified directly. However, any maintenance operation carried out on the management environment involves high costs and delays, due to the complexity of these systems.

As a consequence, organisations with a consolidate resource management environment cannot manage the DMZ, so that their access to the INTERNET is strongly limited.

It is an object of the present invention to overcome the above-mentioned drawbacks. In order to achieve this object, a method as set out in the first claim is proposed.

Briefly, the present invention provides a method of transmitting information across a firewall among a plurality of computers, at least one first of the computers being at a first side of the firewall and at least one second of the computers being at a second side of the firewall, wherein at least one first proxy and at least one second proxy are associated with the at least one first computer at the first side of the firewall and with the at least one second computer at the second side of the firewall, respectively, and wherein a pass through communication tunnel directly connects each first and second proxy, the tunnel being secured by mutual authentication of the corresponding first and second proxies, the method including the steps of: causing a transmitting one of the computers to send a firewall-incompatible message for a receiving one of the computers at the other side of the firewall to a transmitting one of the associated at least one proxy, sending the message from the transmitting proxy to a receiving one of the at least one proxy at the other side of the firewall through the corresponding tunnel, associating the message with the receiving computer, and forwarding the message from the receiving proxy to the receiving computer.

The present invention also provides a computer program application for performing the method, a product storing the program application, and a corresponding system.

Further features and the advantages of the solution according to the present invention will be made clear by the following description of a preferred embodiment thereof, given purely by way of a non-restrictive indication, with reference to the attached figures, in which.

Figure 1A:
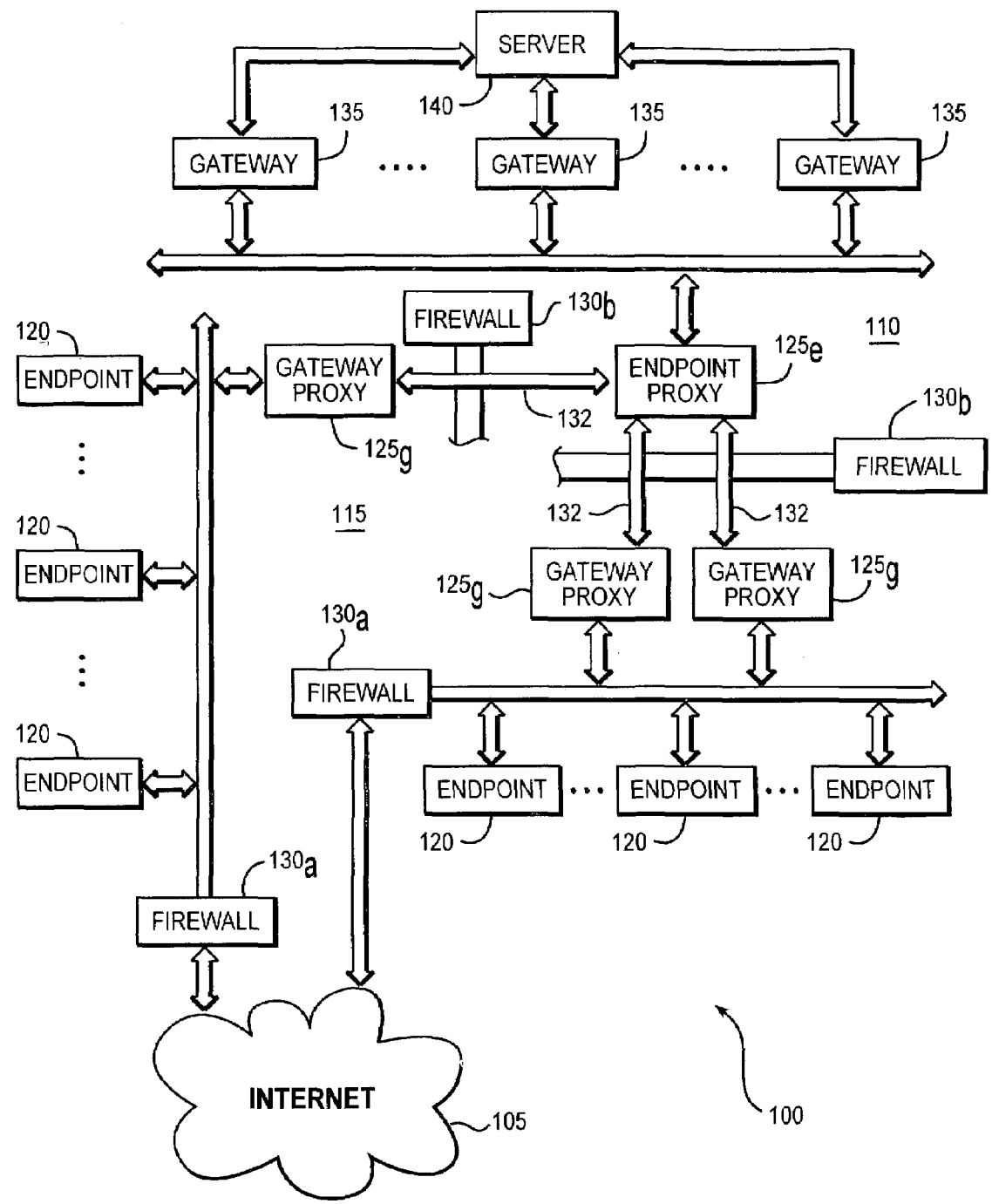
FIG. 1a shows a schematic block diagram of a data processing system in which the method of the invention can be used.

With reference in particular to FIG. 1, a data processing system 100 that relies on the INTERNET 105 is depicted. The INTERNET 105 consists of a network including millions of computers connected to each other through public media. This structure allows an uncontrolled access to the network, so that the INTERNET 105 is open and unprotected, and then not trusted for its own nature.

A private network 110 of an organisation (such as a service provider) interfaces with the INTERNET 105. The private network 110 implements a secure structure, which uses trusted communications lines (for example private lines belonging to the service provider), and it is then closed and protected. The private network 110 is connected to the INTERNET 105 through a Demilitarised Zone (DMZ) 115. The DMZ 115 is an internal line of defense of the private network 110, which sits between the INTERNET 105 and the private network 110. All the communications between the private network 110 and the INTERNET 105 pass through the DMZ 115; in this way, the private network 110 cannot be accessed from the INTERNET 105 directly, in order to avoid exposing the private network 110 to attacks from the outside.

The DMZ 115 includes multiple endpoint computers 120, such as Web (HTTP) servers, FTP servers, SMTP (e-mail) servers and other servers, which are grouped into one or more clusters. The endpoints 120 of each cluster communicate with a lower number of gateway proxies 125g; in the example shown in the figure, a cluster of endpoints 120 is associated with a single gateway proxy 125g, and another cluster of endpoints 120 is associated with two gateway proxies 125g. The DMZ 115 is separated from the INTERNET 105 and from the private network 110 by one or more firewalls 130a and one or more firewalls 130b, respectively.

A firewall is a hardware and/or software system that is installed at a point where two networks with a different level of security meet (also known as choke point), and that enforces a security policy between the two networks; in this way, the firewall can protect the more secure network from attacks coming from the less secure network. All packets entering or leaving the more secure network pass through the firewall, which examines each packet and blocks those that do not meet specified security criteria. Known firewalls use different techniques for controlling the traffic flow between the two networks, such as packet filters (wherein packets are examined at a network layer), application-layer gateways (wherein all application layers are examined, bringing context information into the decision process), and stateful inspection (wherein the state-related information required for security decisions is extracted from all application layers and maintained in dynamic state tables for evaluating subsequent connection attempts).

Each gateway proxy 125g is directly connected to a single endpoint proxy 125e (in the private network 110) by means of a pass through communication tunnel 132, which crosses the firewall 130b with a point-to-point connection establishing a transparent pipe between the two proxies 125g, 125e; security of the tunnel 132 is ensured by mutual authentication of the gateway proxy 125g and the endpoint proxy 125e at its ends. Multiple gateway computers 135 communicate with the endpoint proxy 125e. Each gateway 135 couples one or more endpoints 120 to a server computer 140, which manages the resources of the endpoints 120 from the private network 110.

Figure 1B:
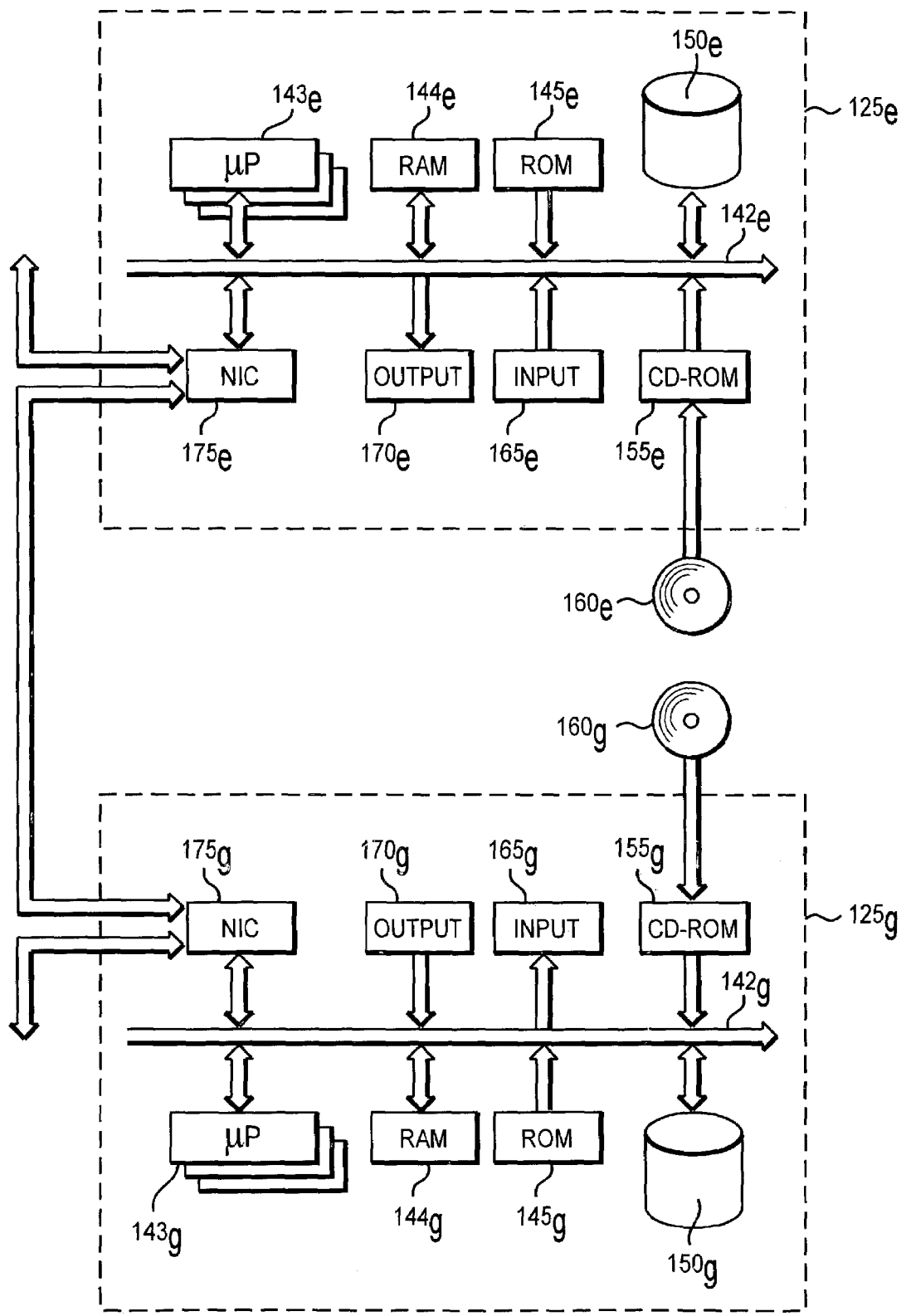
FIG. 1b is a diagrammatic representation of a gateway proxy and of an endpoint proxy of the system.

As shown in FIG. 1b, a generic gateway proxy 125g (for example consisting of a mid-range computer) is formed by several units that are connected in parallel to a communication bus 142g. In detail, multiple microprocessors (μP) 143g control operation of the gateway proxy 125g, a RAM 144g is directly used as a working memory by the microprocessors 143g, and a ROM 145g stores basic programs for a bootstrap of the gateway proxy 125g. Several peripheral units are further connected to the bus 142g (by means of respective interfaces). Particularly, a bulk memory consists of a magnetic hard-disk 150g and a driver 155g for reading CD-ROMs 160g. Moreover, the gateway proxy 125g includes input devices 165g (for example consisting of a keyboard and a mouse), and output devices 170g (for example consisting of a monitor and a printer). A Network Interface Card (NIC) 175g is used to couple the gateway proxy 125g to the associated endpoints and to the endpoint proxy.

The endpoint proxy 125e is likewise formed by a bus 142e, multiple microprocessors 143e, a RAM 144e, and a ROM 145e; the endpoint proxy 125e further includes a hard-disk 150e, a driver 155e for CD-ROMs 160e, input devices 165e and output devices 170e. A network interface card 175e is used to couple the endpoint proxy 125e to the gateways and to the gateway proxies.

Similar considerations apply if the system is used for different applications (such as an e-commerce site), if the system relays on different networks, if the system has a different architecture (for example with a compartmentalised environment), if each cluster of endpoints is associated with a different number of gateway proxies, if a single gateway proxy is associated with all the endpoints or if two or more endpoint proxies are associated with the gateways, if a different number of endpoints and gateways are provided (down to a single one), if the gateway and endpoint proxies have a different structure or include different units (for example, if the gateway proxy has two NICs for the associated endpoints and endpoint proxy, respectively, or if the endpoint proxy has two NICs for the associated gateways and gateway proxies, respectively), and the like.

Figure 2:
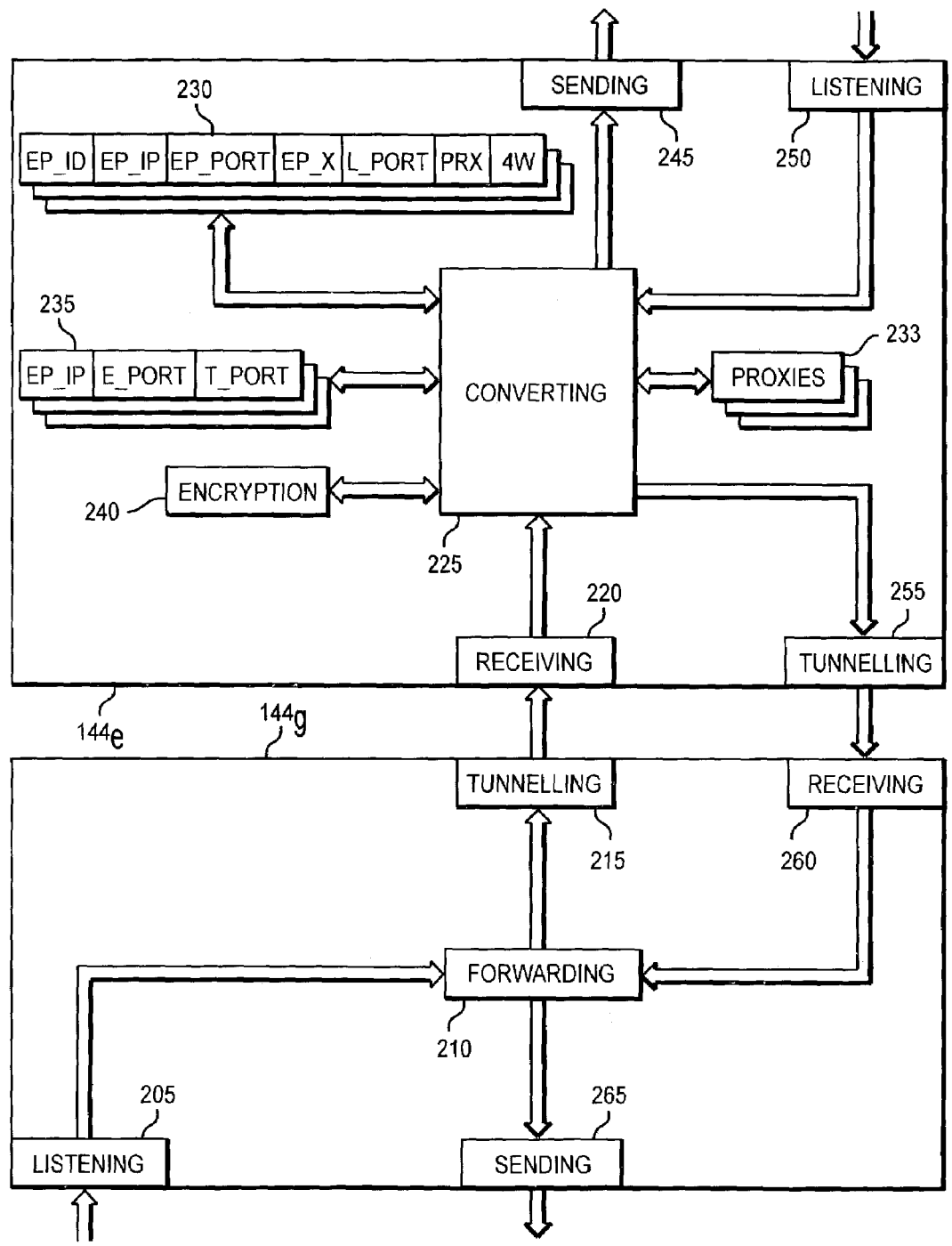
FIG. 2 depicts a partial content of a working memory of the gateway proxy and of the endpoint proxy.

Considering now FIG. 2, a partial content of the working memories 144g and 144e of a generic gateway proxy and of the endpoint proxy, respectively, is shown; the information (programs and data) is typically stored on the hard-disks and loaded (at least partially) into the working memories when the programs are running. The programs are initially installed onto the hard disks from CD-ROM.

With reference in particular to the gateway proxy, a listening process 205 (implemented by means of a corresponding software module) receives packets transmitted from the endpoints. Each packet is provided to a forwarding process 210; the forwarding process 210 detects the IP address of the source endpoint, and attaches the IP address to the packet. The packet (with the attached IP address) is then supplied to a tunneling process 215. The tunneling process 215 acts as a pass through between the gateway proxy and the endpoint proxy, so as to transmit the packet to a receiving process 220 running on the endpoint proxy.

The packet received from the gateway proxy is provided to a converting process 225. The converting process 225 manages a series of memory structures. Particularly, a persistent table 230 is formed by a record for each endpoint currently controlled by the endpoint proxy. The record is composed of a field EP_ID that contains an identifier that is dynamically assigned to the endpoint by the server. A field EP_IP stores the IP address of the endpoint, and a field EP_PORT stores the number of an endpoint port identifying a logical connection to the endpoint. A field EP_K is used for storing an encryption key dynamically generated for the endpoint (together with a possible indication of the corresponding encryption method). The record further includes a field L_PORT storing the number of a listening port allocated on the endpoint proxy on behalf of the endpoint, a field PXR storing the IP address and port number identifying the gateway proxy associated with the endpoint, and a field GW storing the IP addresses and port numbers of a (main) gateway and of possible alternative gateways associated with the endpoint.

A static table 233 includes a record for each cluster of the endpoints. The record stores a set of labels identifying all the gateway proxies that are associated with the endpoints of the cluster.

Moreover, a transient table 235 is formed by a record for each application running on an endpoint, which is initiating a communication with the gateway and requires a gateway reconnection. The record is composed of a field EP_IP that contains the IP address of the endpoint and a field E_PORT that contains the number of a short-lived (or ephemeral) port allocated on the endpoint by the application when the communication is started. A field T_PORT stores the number of a transient port allocated on the endpoint proxy on behalf of the application.

The converting process 225 interfaces with an encryption process 240 (for example based on the DES algorithm), which embeds a shared, static secret key S_K of the endpoints and gateways. The converting process 225 updates the received packet (if necessary); the packet is then provided to a sending process 245, in order to be transmitted to the target gateways.

A listening process 250 receives each packet sent from the gateways to the endpoint proxy. The listening process 250 provides the packet to the converting process 225. The converting process 225 updates the received packet (if necessary), and attaches the IP address and port number of the target endpoint to the packet. The packet (with the attached IP address and port number) is then supplied to a tunneling process 255. The tunneling process 255 transmits the packet to a receiving process 260 running on the gateway proxy associated with the target endpoint.

The packet received from the endpoint proxy is provided to the forwarding process 210. The forwarding process 225 identifies the target endpoint (according to the attached IP address and port number); the packet is then provided to a sending process 265, in order to be transmitted to the target endpoint.

Similar considerations apply if the programs and data are structured in a different manner, if different processes are running on the gateway and endpoint proxies, if the IP addresses and the port numbers are replaced with equivalent physical addresses and logical connections, if different messages are transmitted, if the persistent table, the static table and the transient table have a different format or are replaced with other memory structures, if a different encryption algorithm is employed, and the like.

Figure 3:
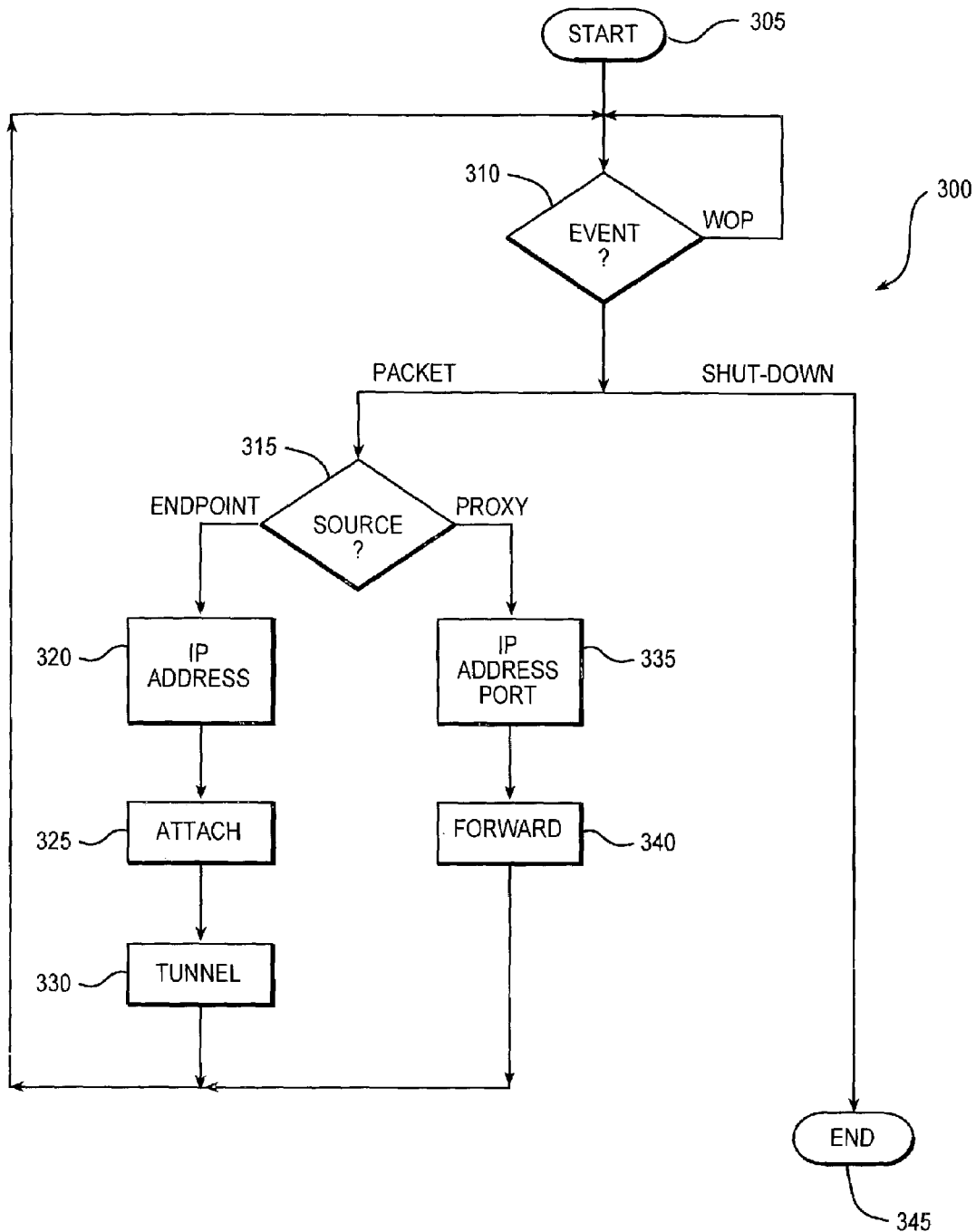
FIG. 3 and FIGS. 4a-4b show flow charts describing the logic of a method executed on the gateway proxy and on the endpoint proxy, respectively, for transmitting information across a firewall of the system.

Moving to FIG. 3, the processes running on a generic gateway proxy perform a method 300 that starts at block 305. The method then cycles in an idle loop at block 310, waiting for an event to occur. When a packet is received, the blocks 315-340 are executed; conversely, if the gateway proxy has been shut down, the method ends at the final block 345.

Considering now block 315, the method verifies the source of the packet. If the packet has been received from an endpoint, the blocks 320-330 are executed, whereas if the packet has been received from the endpoint proxy the blocks 335-340 are executed; in both cases, the method returns to block 310 waiting for a new event to occur.

The gateway proxy receives packets from each associated endpoint that have been either addressed to the gateway proxy directly or broadcast over the network. In detail, whenever the endpoint is turned on it starts an initial login procedure by broadcasting an initial login packet using the UDP protocol. The initial login packet is put onto the network in order to reach a generic gateway (without previously establishing a channel between the endpoint and the gateway); the gateway proxy intercepts all the initial login packets that have been broadcast. After a channel has been established between the endpoint and the corresponding gateway (as described in the following), the endpoint sends any packet to the gateway proxy directly, using the TCP/IP protocol. The packets are conforming to the Endpoint Control Protocol (ECP), wherein the channel is configured and tested so that at least one of its ends is authenticated; this protocol secures the tunnel, providing for data integrity, data privacy and authenticity of the originating party.

In both cases, the gateway proxy detects the IP address of the source endpoint at block 320. Moving to block 325, the IP address of the endpoint is attached to the packet. The packet with the attached IP address is then sent to the endpoint proxy at block 330; the packet is transmitted through the tunnel, preferably using a secure protocol (such as the HTTPS).

On the other end, the gateway proxy receives packets from the endpoint proxy, each one with the IP address and port number of the target endpoint attached thereto. The gateway proxy determines the endpoint at block 335 according to the IP address and port number attached to the packet. The method then passes to block 340, wherein the gateway proxy forwards the packet to the endpoint, using the TCP/IP protocol.

Figure 4A:
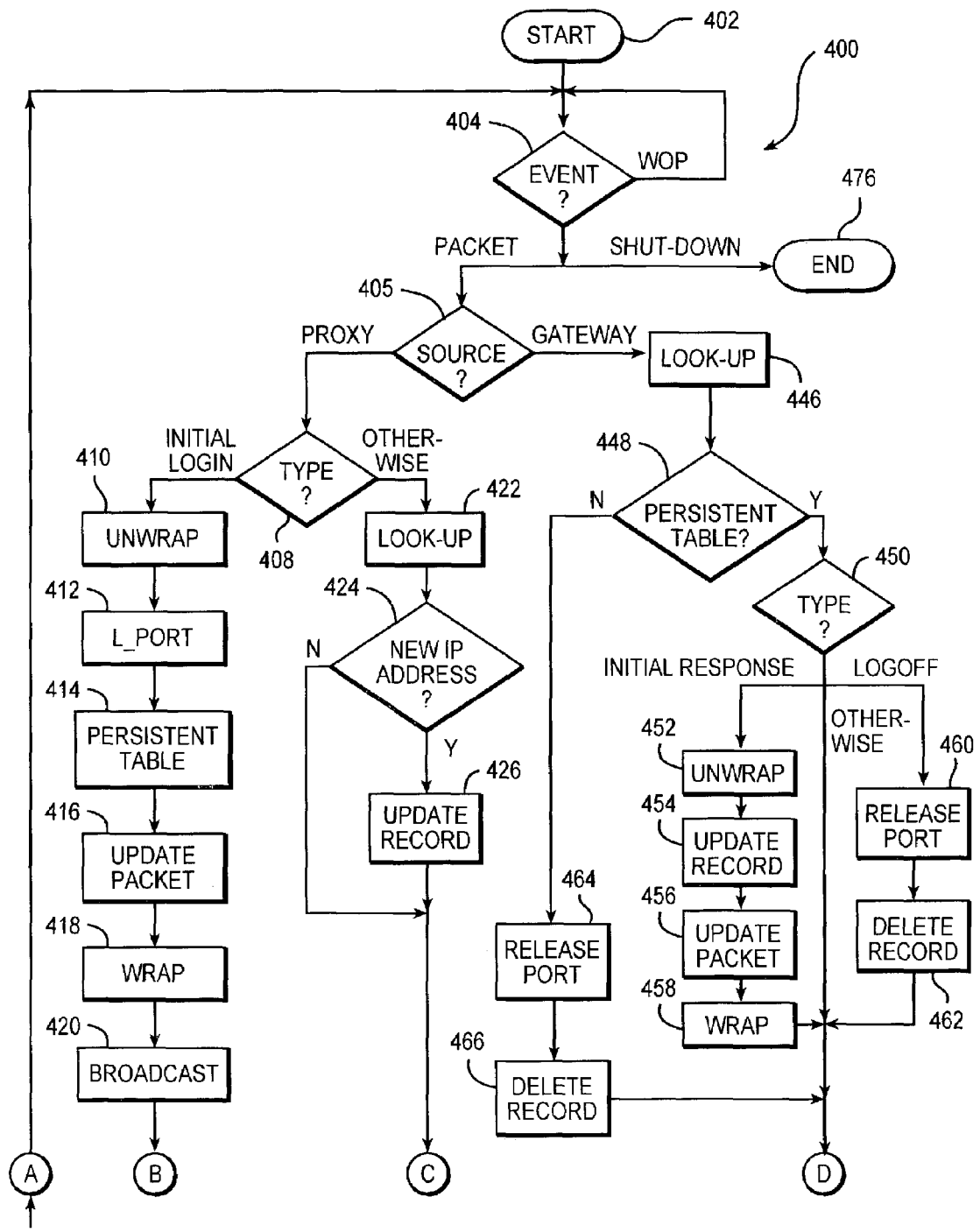
Figure 4B:
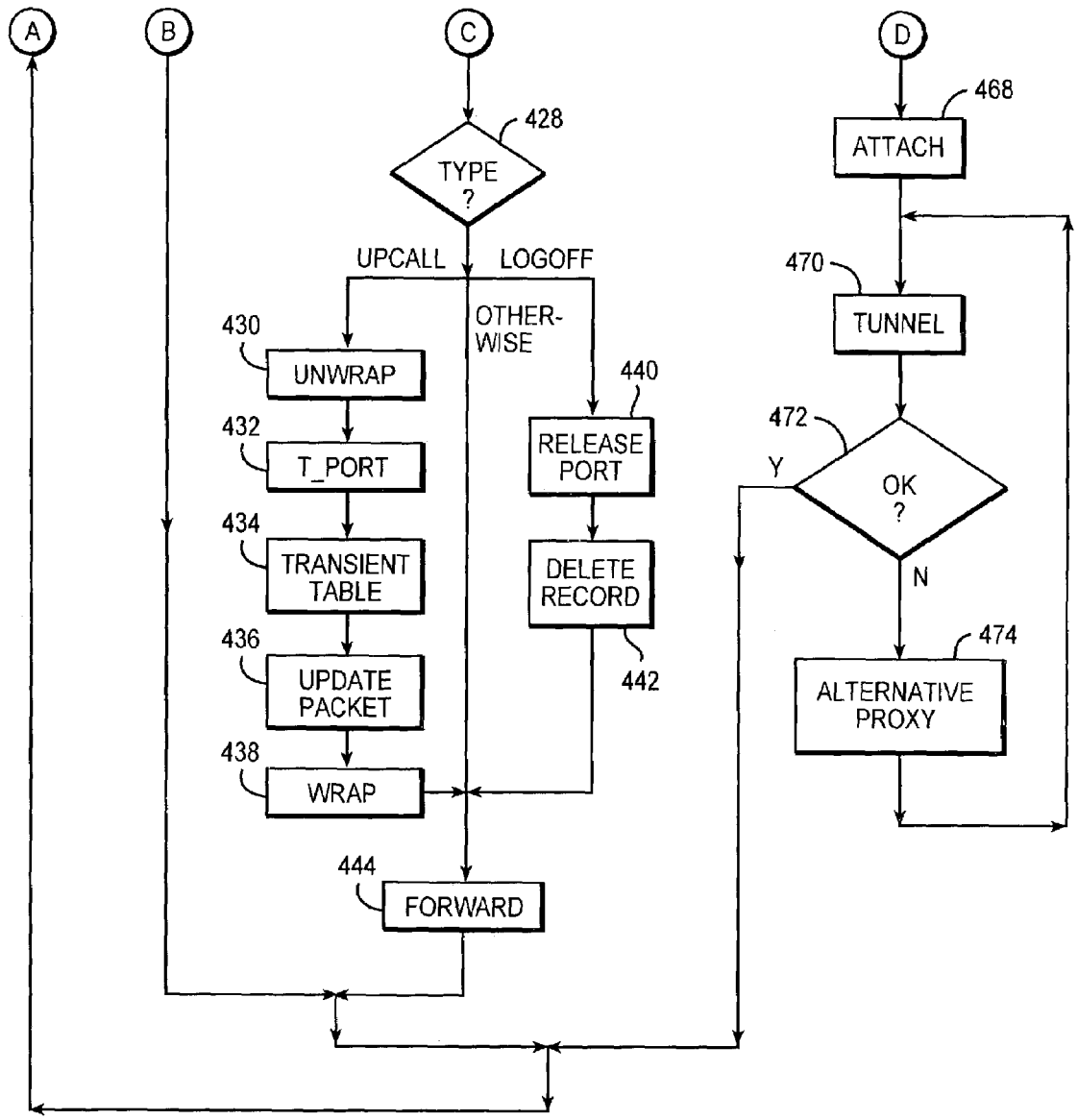

At the same time, as shown in FIGS. 4*a*-4*b*, the processes running on the endpoint proxy perform a method 400 that starts at block 402. The method cycles in an idle loop at block 404, waiting for an event to occur. When a packet is received, the method descends into block 405; conversely, if the endpoint proxy has been shut down, the method ends at the final block 476.

The method verifies the source of the received packet at block 405. If the packet has been received from a gateway proxy, the blocks 408-426 are executed, whereas if the packet has been received from a gateway the blocks 446-466 are executed; in both cases, the method returns to block 405 waiting for a new event to occur.

When the packet has been received from a gateway proxy (block 405), a test is performed at block 408 to determine the type of the packet. If the packet is of the initial login type the blocks 410-420 are executed. Otherwise, the blocks 422-426 are executed and the method then checks the type of the packet at block 428. If the packet is of an upcall type the blocks 430-438 are executed, whereas if the packet is of a logoff type the blocks 440-442 are executed; in both cases, the method then passes to block 444. Otherwise, if the packet is of a different type the method descends into block 444 directly.

On the other hand, if the packet has been received from a gateway (block 406), the record in the (persistent or transient) table associated with the (listening or transient) port number on which the endpoint proxy has been contacted is retrieved at block 446. The method checks at block 448 in which table the record has been found. If the record has been found in the persistent table, the blocks 450-462 are executed; conversely, if the record has been found in the transient table, the blocks 464-466 are executed.

In both cases, the method then passes to block 468, wherein the IP address and port number of the endpoint (extracted from the retrieved record) are attached to the packet. The packet with the attached IP address and port number is then transmitted using the HTTPS protocol to the gateway proxy at block 470, in order to be forwarded to the endpoint. Proceeding to the test block 472, if the gateway proxy is not available an alternative gateway proxy (if any) is selected at block 474 (from the record of the static table including the current gateway proxy); the method then returns to block 470 for transmitting again the packet to the alternative gateway proxy (conversely, the method returns to block 404 directly).

Referring back to block 448, when the record has been found in the persistent table the method checks the type of the received packet at block 450. If the packet is of an initial login response type the blocks 452-458 are executed, whereas if the packet is of a logoff type the blocks 460-462 are executed; otherwise, the method descends into block 468 directly.

Whenever the endpoint proxy receives an initial login packet (block 408), the packet is deciphered (unwrapped)

using the static secret key S_K at block 410. A new listening port (selected in the range of the ephemeral ports from 1024 to 65535 not reserved for standard services) is allocated at block 412 on behalf of the endpoint. The method continues to block 414, wherein a new record is inserted into the persistent table; the record stores the IP address (attached to the packet) and the port number (included in the packet) of the endpoint in the fields EP_IP and EP_PORT, respectively, the listening port number in the field L_PORT, and the identifier of the gateway proxy from which the packet has been received in the field PRX (the fields EP_ID, EP_K and GW are left empty). The endpoint proxy updates the initial login packet at block 416, by replacing the endpoint port number with the listening port number. The method proceeds to block 418, wherein the updated initial login packet is encrypted (wrapped) using the static secret key S_K. The packet so obtained is then broadcast using the UDP protocol at block 420, in order to reach a generic gateway.

The initial login packet is received by a gateway and transmitted to the server. An endpoint manager application running on the server processes the initial login packet (establishing an identifier of the endpoint, selecting a main and possible alternative gateways for managing the endpoint, and generating a new dynamic key for the endpoint according to an agreed upon encryption method); the endpoint manager then causes the (main) gateway to send back a corresponding initial login response message. However, since the initial login packet has been received from the endpoint proxy and includes the listening port number, the gateway is tricked into communication only with the endpoint proxy (on behalf of the endpoint).

As soon as the endpoint proxy receives the initial login response packet (block 450), the packet is unwrapped at block 452, using the static secret key S_K. The record in the persistent table associated with the listening port is completed at block 454; in detail, the endpoint identifier, the dynamic key together with the indication of the encryption method, and the IP addresses and port number of the (main and alternative) gateways (extracted from the packet) are copied into the fields EP_ID, EP_K and GW, respectively. The endpoint proxy updates the initial login response packet at block 456, by replacing the IP addresses and port numbers of the (main and alternative) gateways with the IP address and port number of the gateway proxies, so as to ensure that the endpoint will never connect anything else than the gateway proxy. The method proceeds to block 458, wherein the updated initial login response packet is wrapped using the static secret key S_K. The IP address and port number of the endpoint are attached to the packet so obtained (block 468), and the packet is then transmitted to the associated gateway proxy (blocks 470-474).

Further communications between the endpoint and the corresponding gateway will then flow naturally through the gateway and endpoint proxies. Particularly, when the endpoint proxy receives a generic packet from the gateway proxy (block 408), the record associated with the endpoint is retrieved from the persistent table at block 422 (according to the endpoint identifier extracted from the packet). A test is performed at block 424 to verify whether the IP address attached to the packet is different than the one stored in the retrieved record. If so, the respective field EP_IP is updated at block 426 accordingly, and the method then continues to block 428; on the contrary, the method passes to block 428 directly. If the packet is not of the upcall or logoff type (block 428), the method descends into block 444; the packet is then forwarded to the IP address and port number of the corresponding gateway (extracted from the field GW of the retrieved record), using the TCP/IP protocol.

On the other hand, when the endpoint proxy receives a generic packet from a gateway (block 406), the record in the persistent table associated with the listening port number on which the endpoint proxy has been contacted is retrieved (block 446). If the packet is not of the initial login response type or of the logoff type (block 450), the method descends into block 468, so as to transmit the packet to the gateway proxy (blocks 468-474).

In addition, whenever an application running on an endpoint needs to contact the corresponding gateway, an ephemeral port is allocated on the endpoint and a respective upcall packet is sent to the gateway proxy. When the endpoint proxy receives the upcall packet (block 428), the packet is unwrapped at block 430 using the dynamic key extracted from the field EP_K of the retrieved record. A new transient port (selected in the range of the ephemeral ports) is allocated at block 432 on behalf of the application (and a corresponding listener on this port is started). The method continues to block 434, wherein a new record is inserted into the transient table; the record stores the IP address of the endpoint in the field EP_IP, the ephemeral port number of the application in the field E_PORT, and the corresponding transient port number in the field T_PORT. The endpoint proxy updates the upcall packet at block 436, by replacing the ephemeral port number with the transient port number. The method proceeds to block 438, wherein the updated upcall packet is wrapped using the dynamic key. The packet so obtained is then forwarded to the corresponding gateway (block 444).

The upcall packet is received and processed by the gateway, which then sends back a response message requesting information from the endpoint. As soon as the endpoint proxy, on behalf of the endpoint, receives the response packet on a port number associated with a record in the transient table (block 448), the corresponding listener on the transient port is terminated at block 464 (so as to release the port). Proceeding to block 466, the record associated with the transient port number is deleted from the transient table. The IP address and ephemeral port number of the endpoint are attached to the packet (block 468), and the packet is then transmitted to the gateway proxy (blocks 470-474).

On the other hand, when the endpoint proxy receives a logoff packet from the gateway proxy (block 428), the corresponding listening port (extracted from the field L_PORT of the retrieved record) is released at block 440. Proceeding to block 442, the record associated with the endpoint is deleted from the persistent table. The logoff packet is then forwarded to the corresponding gateway (block 444).

In a similar manner, when the endpoint proxy receives a logoff packet from a gateway on a listening port (block 450), the listening port is released at block 460. Proceeding to block 462, the record associated with the listening port is deleted from the persistent table. The IP address and port number of the endpoint are attached to the packet (block 468), and the packet is then transmitted to the gateway proxy (blocks 470-474).

Similar considerations apply if the processes perform equivalent methods, for example with error routines, if equivalent trusted messages are transmitted between the endpoints and gateways, if different protocols (not supported by the firewall) are used between the endpoints or gateways and the respective proxies, if the tunnel is secured in a different manner, if only the main gateway is associated with each endpoint, if the port numbers are selected in a different range, if no logoff packet is supported, and the like.

More generally, the present invention provides a method of transmitting information across a firewall among a plurality of computers; one or more first computers are at a first side of the firewall and one or more second computers are at a second side of the firewall. One or more first proxies and one or more second proxies are associated with the first computers at the first side of the firewall and with the one or more second computers at the second side of the firewall, respectively. A pass through communication tunnel directly connects each first and second proxy; the tunnel is secured by mutual authentication of the corresponding first and second proxies. The method starts with the step of causing a transmitting one of the computers to send a firewall-incompatible message for a receiving one of the computers at the other side of the firewall to a transmitting one of the associated proxies. The message is sent from the transmitting proxy to a receiving one of the proxies at the other side of the firewall through the corresponding tunnel. The message is associated with the receiving computer, and it is then forwarded from the receiving proxy to the receiving computer.

The solution of the invention is very secure, since all the communications not supported by the firewall transit through a few proxies at each side of the firewall; in this way, all efforts to enforce security in the system may be concentrated on well-defined connections.

In this respect, it should be noted that the proposed solution actually opens a hole in the firewall; however, the tunnel crossing this hole is secured by mutual authentication of the proxies, so that the additional components of the invention do not introduce security problems, but improve security of the system as a whole.

Moreover, the proposed method may be implemented with add-on components, without requiring either the gateways or the endpoints to be modified directly.

Therefore, even organisations with a consolidate management environment may manage the DMZ; therefore, they may expand their private network in order to access the INTERNET in a very fast and inexpensive manner.

The preferred embodiment of the invention described above offers further advantages.

Particularly, each gateway contacts a corresponding listening port of the endpoint proxy each time it needs to communicate with an endpoint; the endpoint proxy will route the packet based on the port number it has been contacted on.

The proposed structure strongly improves the security of the system, since all the sensitive information needed to route the packets is stored in the secure zone protected by the firewall.

Moreover, each packet sent from the endpoint is associated with an identifier of the endpoint, which is used to determine the corresponding gateway by the endpoint proxy.

As a consequence, the gateway proxy limits itself to forward the packet to the endpoint proxy, without posing any security concern.

Advantageously, each packet is transmitted between the endpoint or gateway and the respective proxy using an insecure protocol, and it is transmitted between the two proxies using a secure protocol.

The proxies then act as protocol converters. As a consequence, the endpoints and gateways are allowed to use whatever protocol, without affecting the security of the transmission across the firewall (being the two proxies authenticated to each other).

However, the solution of the present invention leads itself to be carried out even routing the packets in a different manner, using equivalent identifiers of the endpoint (such as the IP address and endpoint port number included in the packet), or employing a single protocol for all the communications.

In a preferred embodiment of the invention, the set up of the proxies is handled during an initial login procedure, wherein a listening port is allocated on the endpoint proxy (on behalf of the endpoint), a new record is created in the persistent table, and the initial login packet is updated accordingly.

These steps force all communications from the gateways to flow through the endpoint proxy in a very simple manner.

Moreover, the corresponding initial login response packet is updated replacing the IP address and port number of the gateways with the ones of the gateway proxy.

In this way, the endpoint will be tricked into communication only with the gateway proxy.

Advantageously, the gateway proxy retains knowledge of the dynamic key generated for the endpoint. Any upcall packet is then handled by allocating a transient port on the endpoint proxy (on behalf of the application), creating a new record in the transient table, and updating the upcall packet accordingly.

These steps force the gateway to answer the application through the endpoint proxy.

Moreover, when the corresponding answer is received, the endpoint proxy will release the transient port and delete the corresponding record in the transient table.

In this way, resources on the endpoint proxy are readily released as soon as the response message has been redirected to the application.

Advantageously, the gateway proxy detects the IP address of the endpoint and attaches the IP address to the packet that is transmitted to the endpoint proxy, in order to keep the value stored in the persistent table up-to-date.

This feature allows the system to retain support for the Network Address Translation (NAT) standard, wherein the private network uses one set of IP addresses for internal traffic and a second set of IP addresses for external traffic, and for the Dynamic Host Configuration Protocol (DHCP), wherein dynamic IP addresses are assigned to the computers of the network.

Moreover, two or more gateway proxies are associated with each cluster of endpoints; an alternative gateway proxy for an endpoint is employed by the endpoint proxy when the one from which the respective initial login packet has been received is not available.

This structure provides an architecture that is fault-tolerant.

However, the solution of the invention is also suitable to be implemented with a different procedure for setting up the proxies, without employing any dynamic key, with a different protocol for handling the upcall packets, without the possibility of dynamically changing the IP addresses of the endpoints, or even associating only a single gateway proxy with each cluster of endpoints.

Preferably, the method of the invention is used to manage a DMZ, even if different applications (wherein the endpoints and gateways are replaced by generic computers at opposite sides of a firewall) are contemplated and within the scope of the invention.

Advantageously, the solution according to the present invention is implemented with a computer program application, which is provided on CD-ROM. The application consists of software modules installed on the gateway and endpoint proxies.

Alternatively, the application is provided on floppy-disks, is pre-loaded onto the hard-disks, or is stored on any other computer readable medium, is sent to the proxies through the network, is broadcast, or more generally is provided in any other form directly loadable into the working memories of the proxies. However, the method according to the present invention leads itself to be carried out even with a hardware structure, for example integrated in chips of semiconductor material.

Moreover, it should be noted that the gateway and endpoint proxies described-above are suitable to be implemented and put on the market even as an add-on feature, in order to be used with existing data processing systems.

Naturally, in order to satisfy local and specific requirements, a person skilled in the art may apply to the solution described above many modifications and alterations all of which, however, are included within the scope of protection of the invention as defined by the following claims.

The invention claimed is:

1. A method of transmitting information across a firewall among a plurality of computers, at least one first of the computers being at a first side of the firewall and at least one second of the computers being at a second side of the firewall, wherein at least one first proxy at the first side of the firewall and at least one second proxy at the second side of the firewall are associated respectively with the at least one first computer and with the at least one second computer, including the steps of:

generating a plurality of firewall-incompatible messages that enable a server that is connected to the at least one second of the computers at the second side of the firewall to manage resources of the at least one first computer at the first side of the firewall;

establishing a pass-through communication tunnel that directly connects each first and second proxy, the communication tunnel being secured by mutual authentication of the corresponding first and second proxies;

causing a transmitting one of the computers to send a firewall-incompatible message, of the plurality of firewall-incompatible messages, for a receiving one of the computers at the other side of the firewall to a transmitting one of the associated at least one proxy;

sending the firewall-incompatible message from the transmitting proxy to a receiving one of the at least one proxy at the other side of the firewall through the corresponding tunnel;

associating the firewall-incompatible message with the receiving computer; and forwarding the firewall-incompatible message from the receiving proxy to the receiving computer, wherein each first computer consists of an endpoint in a demilitarized zone and each second computer consists of a gateway in a private network, further including the steps under the control of the second proxy of:

receiving a message of an initial login type encrypted with a shared static key from the first proxy, the initial login message being indicative of a request for an initial login from a first computer and being associated with an indication of a first address and a first logical connection of the first computer, deciphering the initial login message using the static key, allocating a corresponding listening logical connection to the second proxy, storing a memory structure associating the listening logical connection with the first address and the first logical connection, updating the initial login message by replacing the first logical connection with the listening logical connection, and encrypting the initial login message using the static key;

wherein the at least one first computer and the at least one first proxy consist of a plurality of first computers and a plurality of first proxies, respectively, an identifier of the first proxies being stored in a further memory structure on the second proxy, and further including the steps under the control of the second proxy of:

associating the identifier of a current first proxy from which the initial login message is received with the corresponding first address and first logical connection in the memory structure, determining the current proxy corresponding to each message received from each second computer using the memory structure, and transmitting the message to the current first proxy when available or to a different one of the associated first proxies in the further memory structure otherwise.

2. A system for transmitting information across a firewall among a plurality of computers, at least one first of the computers being at a first side of the firewall and at least one second of the computers being at a second side of the firewall, wherein at least one first proxy at the first side of the firewall and at least one second proxy at the second side of the firewall are associated respectively with the at least one first computer and with the at least one second computer, the system comprising:

means for generating a plurality of firewall-incompatible messages that enable a server that is connected to the at least one second of the computers at the second side of the firewall to manage resources of the at least one first computer at the first side of the firewall;

a pass-through communication tunnel that directly connects each first and second proxy, the communication tunnel being secured by mutual authentication of the corresponding first and second proxies;

means for causing a transmitting one of the computers to send a firewall-incompatible message, of the plurality of firewall-incompatible messages, for a receiving one of the computers at the other side of the firewall to a transmitting one of the associated at least one proxy;

means for sending the firewall-incompatible message from the transmitting proxy to a receiving one of the at least one proxy at the other side of the firewall through the corresponding tunnel;

means for associating the firewall-incompatible message with the receiving computer; and means for forwarding the firewall-incompatible message from the receiving proxy to the receiving computer, wherein each first computer consists of an endpoint in a demilitarized zone and each second computer consists of a gateway in a private network, the system further comprising, under the control of the second proxy:

means for receiving a message of an initial login type encrypted with a shared static key from the first proxy, the initial login message being indicative of a request for an initial login from a first computer and being associated with an indication of a first address and a first logical connection of the first computer, means for deciphering the initial login message using the static key, means for allocating a corresponding listening logical connection to the second proxy, means for storing a memory structure associating the listening logical connection with the first address and the first logical connection, means for updating the initial login message by replacing the first logical connection with the listening logical connection, and means for encrypting the initial login message using the static key;

wherein the at least one first computer and the at least one first proxy consist of a plurality of first computers and a plurality of first proxies, respectively, an identifier of the first proxies being stored in a further memory structure on the second proxy, and further including, under the control of the second proxy:

means for associating the identifier of a current first proxy from which the initial login message is received with the corresponding first address and first logical connection in the memory structure, means for determining the current proxy corresponding to each message received from each second computer using the memory structure, and means for transmitting the message to the current first proxy when available or to a different one of the associated first proxies in the further memory structure otherwise.

3. A computer program product in a tangible computer readable medium for transmitting information across a firewall among a plurality of computers, at least one first of the computers being at a first side of the firewall and at least one second of the computers being at a second side of the firewall, wherein at least one first proxy at the first side of the firewall and at least one second proxy at the second side of the firewall are associated respectively with the at least one first computer and with the at least one second computer, the computer program product comprising:

instructions for generating a plurality of firewall-incompatible messages that enable a server that is connected to the at least one second of the computers at the second side of the firewall to manage resources of the at least one first computer at the first side of the firewall;

instructions for establishing a pass-through communication tunnel that directly connects each first and second proxy, the communication tunnel being secured by mutual authentication of the corresponding first and second proxies;

instructions for causing a transmitting one of the computers to send a firewall-incompatible message, of the plurality of firewall-incompatible messages, for a receiving one of the computers at the other side of the firewall to a transmitting one of the associated at least one proxy;

instructions for sending the firewall-incompatible message from the transmitting proxy to a receiving one of the at least one proxy at the other side of the firewall through the corresponding tunnel;

instructions for associating the firewall-incompatible message with the receiving computer; and instructions for forwarding the firewall-incompatible message from the receiving proxy to the receiving computer, wherein each first computer consists of an endpoint in a demilitarized zone and each second computer consists of a gateway in a private network, further including, under the control of the second proxy:

instructions for receiving a message of an initial login type encrypted with a shared static key from the first proxy, the initial login message being indicative of a request for an initial login from a first computer and being associated with an indication of a first address and a first logical connection of the first computer, instructions for deciphering the initial login message using the static key, instructions for allocating a corresponding listening logical connection to the second proxy, instructions for storing a memory structure associating the listening logical connection with the first address and the first logical connection, instructions for updating the initial login message by replacing the first logical connection with the listening logical connection, and instructions for encrypting the initial login message using the static key;

wherein the at least one first computer and the at least one first proxy consist of a plurality of first computers and a plurality of first proxies, respectively, an identifier of the first proxies being stored in a further memory structure on the second proxy, and further including, under the control of the second proxy:

instructions for associating the identifier of a current first proxy from which the initial login message is received with the corresponding first address and first logical connection in the memory structure, instructions for determining the current proxy corresponding to each message received from each second computer using the memory structure, and instructions for transmitting the message to the current first proxy when available or to a different one of the associated first proxies in the further memory structure otherwise.

* * * * *